United States Patent [19]

Castoe

[11] Patent Number: 4,457,164
[45] Date of Patent: Jul. 3, 1984

[54] TESTING OF OIL SEALS IN POWER-ASSISTED RACK AND PINION STEERING UNITS

[76] Inventor: John H. Castoe, 10234 McVine St., Sunland, Calif. 91040

[21] Appl. No.: 412,083

[22] Filed: Aug. 27, 1982

[51] Int. Cl.³ ............................................. G01M 3/26
[52] U.S. Cl. ......................................... 73/46; 73/49.7; 73/432 SD
[58] Field of Search ........... 73/46, 49.7, 49.8, 432 SD

[56] References Cited

U.S. PATENT DOCUMENTS 3,100,392  8/1963  Skinner .................................... 73/46
3,207,254  9/1965  D'Espinassy De Venel ... 73/49.7 X Primary Examiner—S. Clement Swisher
Assistant Examiner—Joseph W. Roskos
Attorney, Agent, or Firm—Christie, Parker & Hale

[57] ABSTRACT

An oil seal test unit tests for leakage of oil seals in a rack and pinion steering unit having (a) a pinion housing with a main supply pressure inlet and outlet, and left and right turn fluid pressure connections; (b) a rack housing with left turn and a right turn fluid pressure fittings; and (c) right and left tie rod ends. The test unit includes a pump for supplying hydraulic fluid under pressure through a main supply line connected to the inlet of the pinion housing. A return line connected to an outlet from the pinion housing returns fluid to the pump reservoir. Steering pressure is simulated by a reciprocating bar secured to the tie rod ends of the steering unit. A hydraulic cylinder has a piston with an actuating rod connected to the reciprocating bar. Right or left turning movement of the steering unit moves the tie rods which, in turn, applies pressure against hydraulic fluid in the cylinder. A valve in the hydraulic line connected to the cylinder can be metered down to increase simulated steering resistance. A steering pressure divider is substituted for either the right turn or left turn pressure lines of the steering unit. The divider includes a first line for connection to the right or left turn fluid pressure connection of the pinion housing, a second line for connection to the right or left turn fluid pressure fitting of the rack housing, a valve for controlling flow from the first to the second line, and a gauge for indicating the pressure of fluid flowing from the first to the second line. The seals in the pinion housing can be tested for leakage against the simulated steering pressure; and separately, the seals in the rack housing can be tested for leakage against the simulated steering pressure. A difference in readings on the main pressure gauge and the divider gauge indicates oil leakage.

10 Claims, 6 Drawing Figures

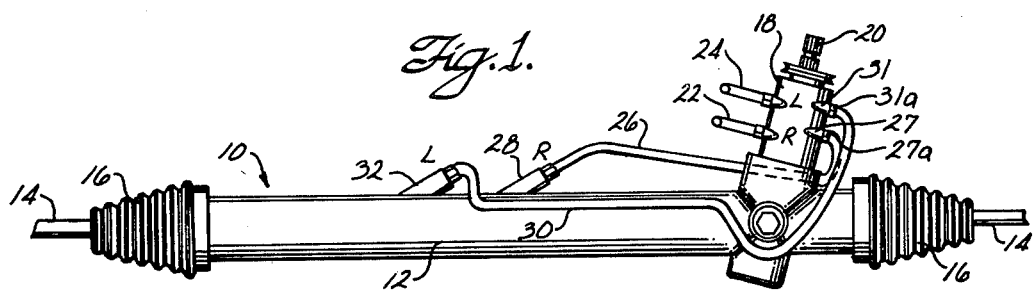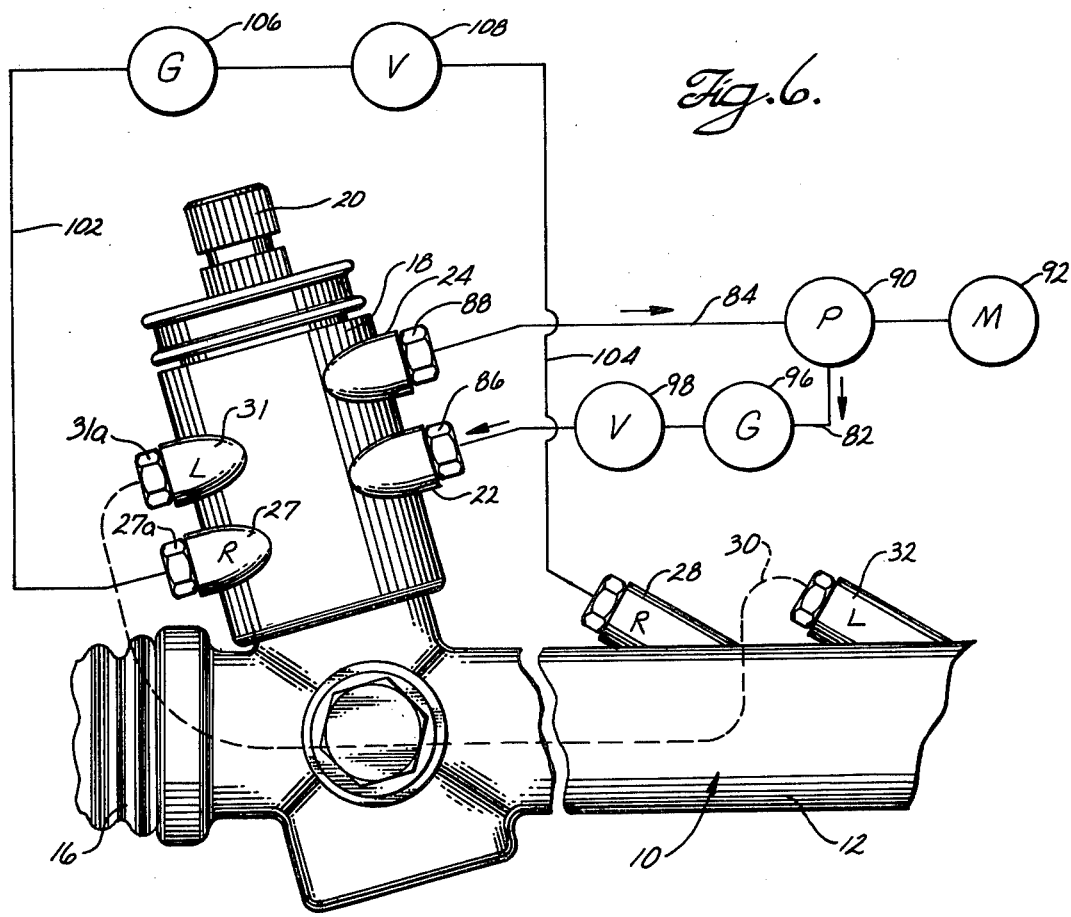

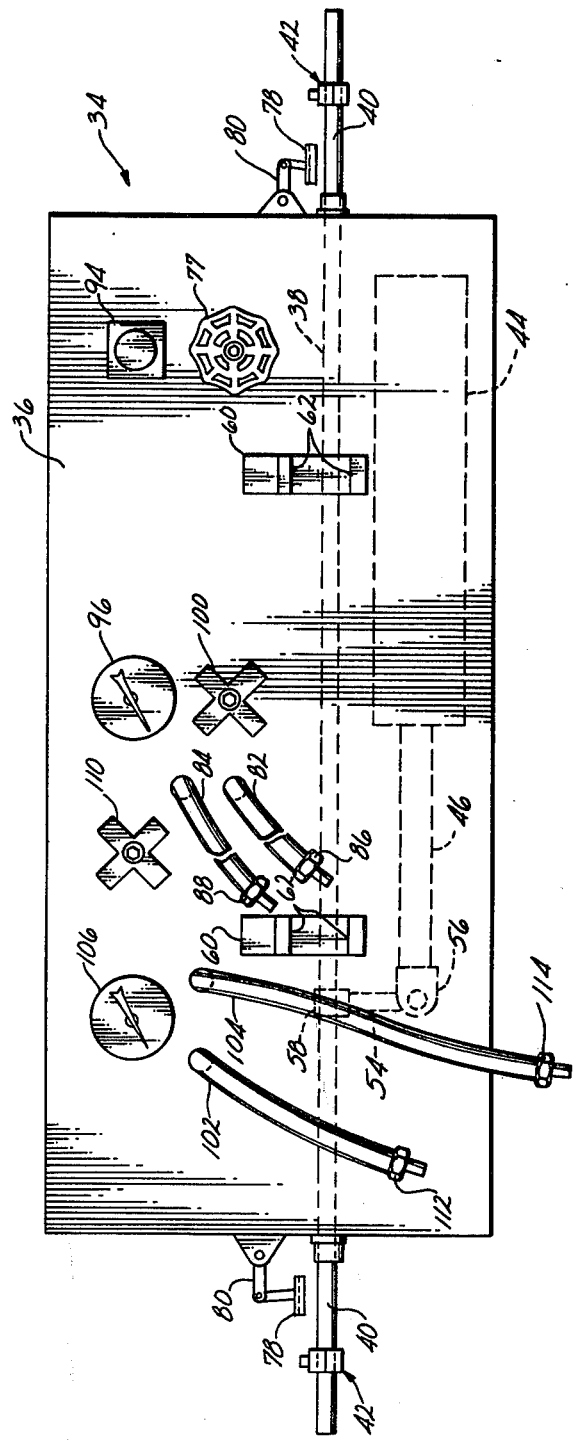

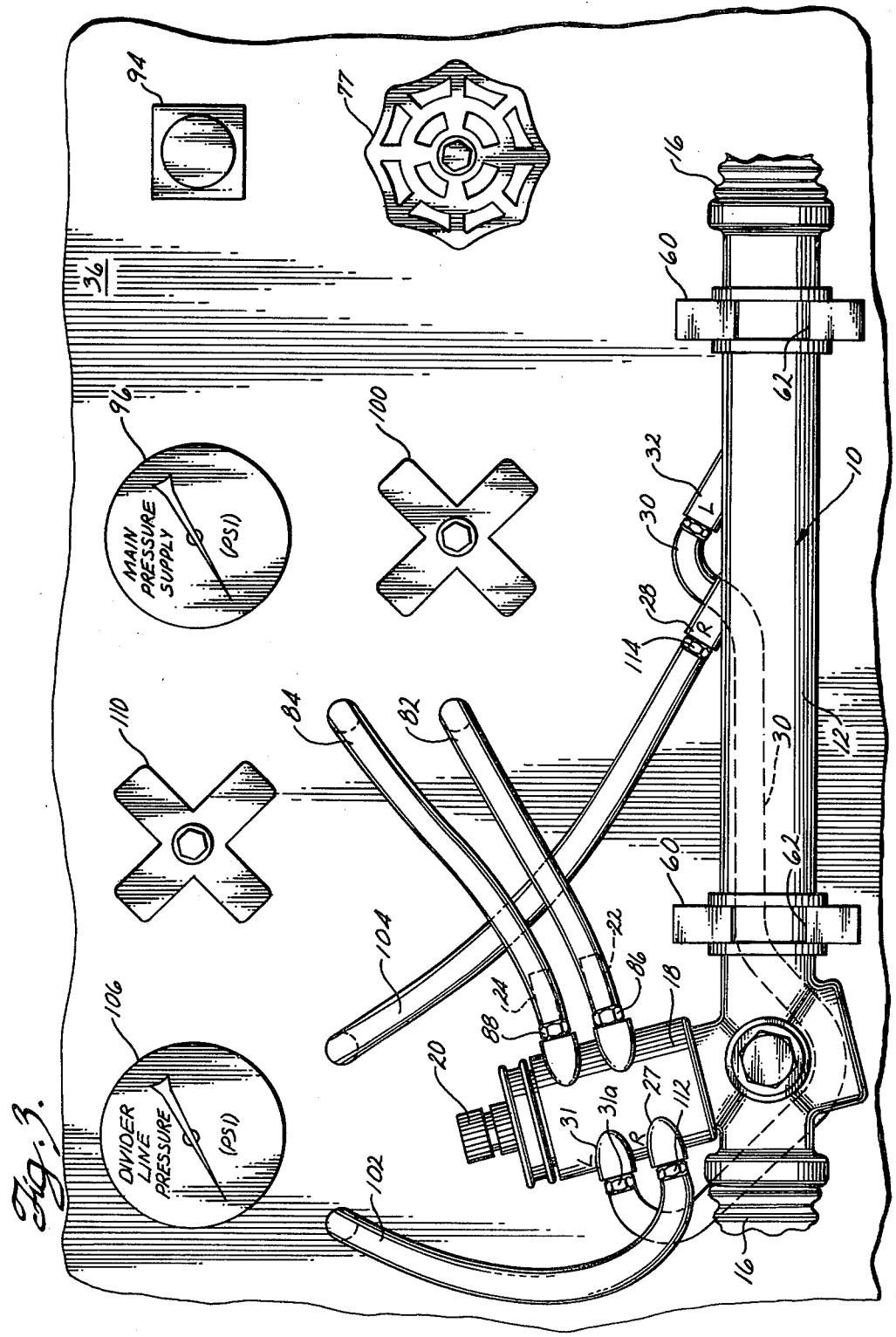

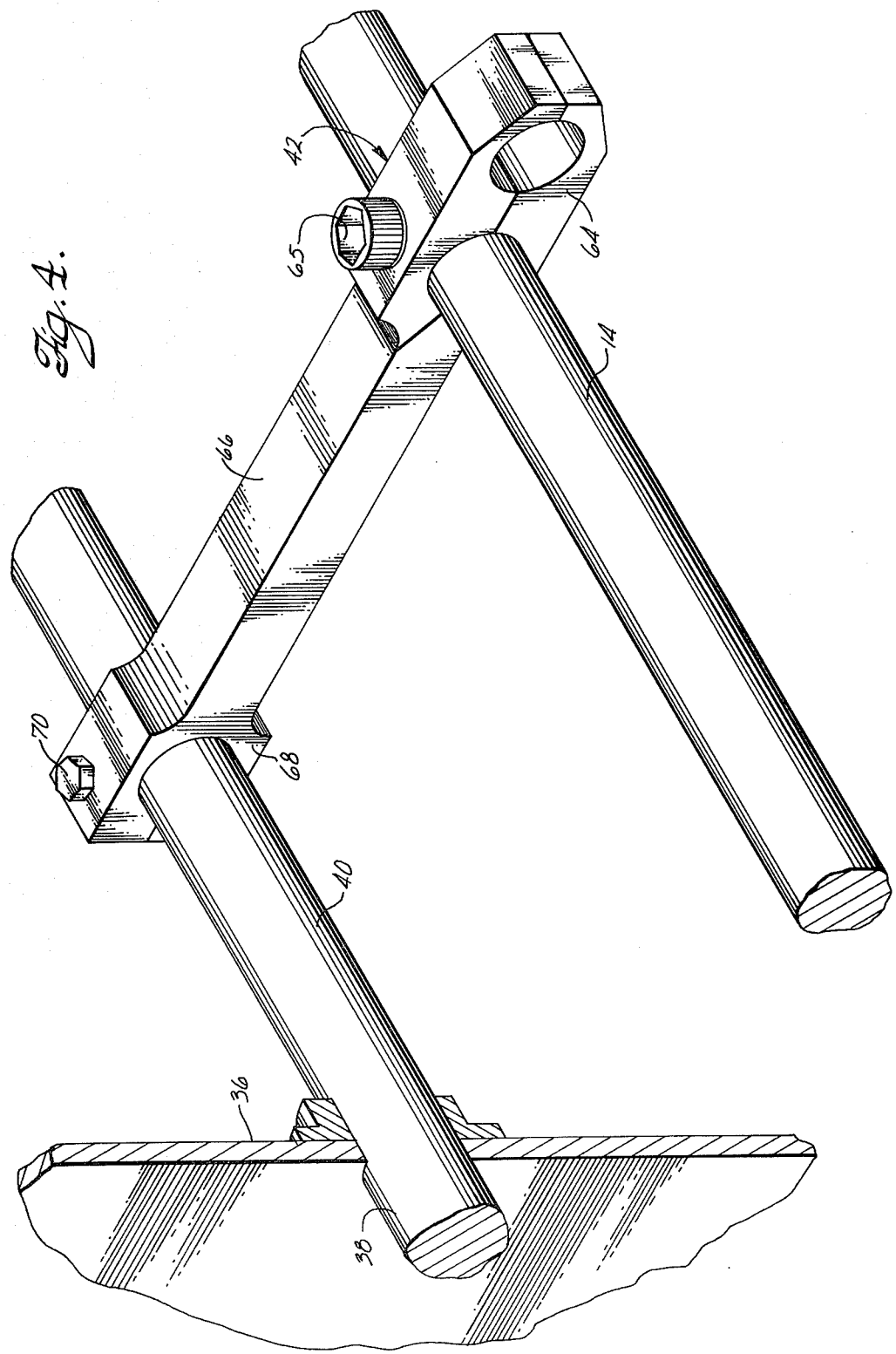

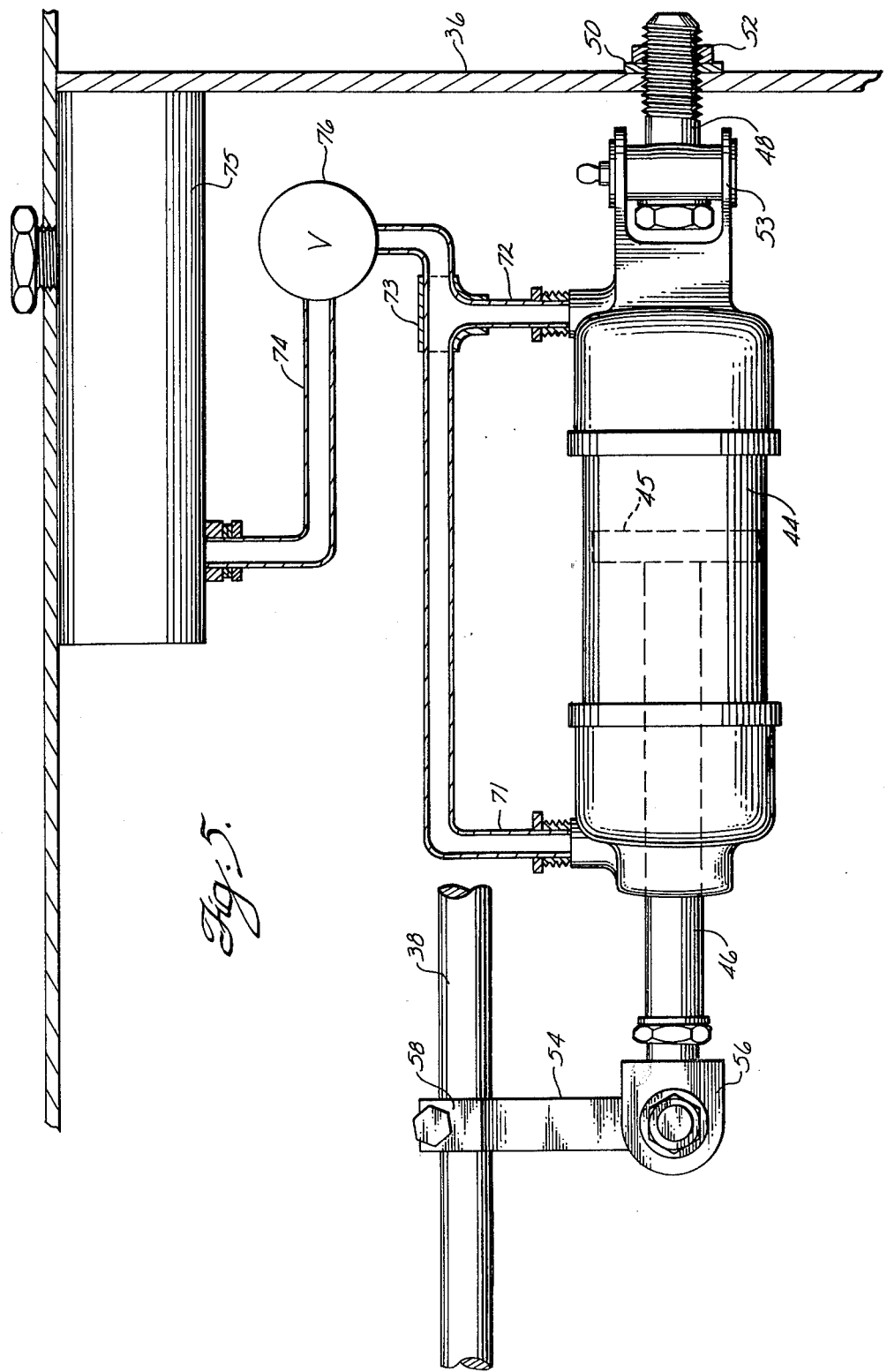

TESTING OF OIL SEALS IN POWER-ASSISTED RACK AND PINION STEERING UNITS

FIELD OF THE INVENTION

This invention relates to an oil seal test unit used by auto mechanics to test for oil leakage in power-assisted rack and pinion steering units.

BACKGROUND OF THE INVENTION

A power-assisted rack and pinion steering unit has a number of internal oil seals. If oil leakage is present, one or more of the seals may require replacement. It is much less expensive to remove and replace the seals than to replace the entire power steering unit. However, it is usually difficult to determine which oil seals have an oil leakage problem. External oil leakage in some oil seals can be found by visual inspection; but oil leakage in most of the oil seals, such as the internal high pressure rack oil seal, cannot be determined by visual inspection.

One auto manufacturer recommends testing the rack and pinion steering unit for oil leakage while leaving the rack and pinion unit in place in the vehicle. However, in this instance it is difficult to reach the oil seals. If the power steering unit is removed from the vehicle, there is no method presently available for effectively testing all of the oil seals in the unit for leakage. The oil seals cannot be effectively tested absent the steering resistance of the wheels and the weight of the vehicle acting against turning of the power steering unit.

In a power-assisted rack and pinion steering unit, the rack is mounted in a long tubular portion of the housing. A power cylinder within the housing has a piston connected to the rack, and a rotary control valve in a pinion portion of the housing controls the flow of power steering fluid to the piston. When the steering wheel is turned, the resistance of the wheels and the weight of the vehicle cause a torsion bar in the steering unit to deflect. This deflection changes the position of the valve spool and sleeve ports, directing fluid under pressure through oil gallies to the appropriate end of the power cylinder. The difference in pressure forces on the piston which helps in moving the rack to assist the turning effort. The oil in the opposite end of the power cylinder is forced to the control valve and back to the pump reservoir.

The steering unit includes a right turn pressure line and a left turn pressure line both leading from the pinion housing and extending to opposite sides of the piston in the power cylinder. During a right turn, for example, power steering fluid is forced under pressure through the right turn pressure line and returned to the control valve through the left turn pressure line.

There are a number of oil seals in the pinion portion of the housing which can be subject to leakage—the lower pinion seal in the lower portion of the pinion housing, and four upper pinion seals on the valve spool. In addition, there are three oil seals in the rack portion of the steering unit—the bulkhead seal, the rack seal, and the high pressure inner rack seal.

There is a need for a technique to test all of these oil seals for leakage while the power steering unit is removed from the vehicle. In this way, it would be possible to accurately isolate the areas where oil seal leakage is present, not to mention the advantages of reduced labor and time and lower expense in conducting tests with the steering unit removed from the vehicle.

SUMMARY OF THE INVENTION

Briefly, this invention provides an oil seal test unit that can test for oil leakage in different areas of a power-assisted rack and pinion steering unit for isolating the oil seals responsible for any leakage that may be present.

In one embodiment of the invention, the rack and pinion steering unit is removed from the vehicle and mounted on the test unit. The tie rods at opposite ends of the power steering unit are connected to opposite ends of a reciprocating steering resistance-simulating bar in the test unit. The bar is connected to a piston in a hydraulic cylinder. Right or left movement of the tie rods (in response to right or left turning of the input shaft to the pinion housing) moves the bar against the force of the hydraulic fluid in the cylinder which simulates steering effort during a right or left turn. A needle valve can control the amount of resistance provided by the hydraulic fluid in the cylinder. In addition, stops can be provided on the steering resistance simulating bar to simulate the stops at the right or left ends of steering travel.

The test unit also includes main hydraulic pressure supply and return lines which are connected to the main supply and return ports in the pinion housing of the steering unit. A pump in the test unit supplies hydraulic fluid under pressure through the supply line to the pinion housing. Return fluid is returned to the pump's reservoir through the return line. The supply line also includes a valve for controlling the operating pressure of the hydraulic fluid supplied to the pinion housing. A gauge in the supply line measures hydraulic pressure supplied to the pinion housing.

The test unit further includes a hydraulic pressure fluid divider for being substituted for either the right or left turn pressure lines of the rack and pinion steering unit. The divider includes a first hydraulic line adapted for connection to either the right or left turn pressure line connection to the pinion housing. A second hydraulic line in the test unit is adapted for connection to either the right or left turn pressure line connection to the rack portion of the power steering unit. A control valve controls the flow of fluid from the first line to the second line of the divider. A pressure gauge measures hydraulic pressure of fluid flowing from the first line to the second line of the divider.

The pinion housing seals can be checked by putting stops in place at opposite ends of the steering pressure simulating bar and closing the valve in the divider line. The divider is substituted for one of the right or left turn pressure lines. By then turning the input shaft of the pinion housing, pressure which simulates steering effort is placed on the pinion seals. The reading on the pressure divider gauge is compared with the reading on the main pressure line gauge. If the readings are equal, no leakage is present in the seals in the pinion portion of the housing. On the other hand, if a pressure differential exists, it indicates leakage past the pinion seals. The divider is then substituted for the other of the right or left turn pressure lines and the same test is conducted to test the other side of the seals in the pinion housing.

To check the rack seals, the pressure fluid divider is first substituted for the right turn pressure line, with the left turn pressure line being left in place. (Alternatively, the divider can be substituted for the left turn pressure line and the right turn hydraulic pressure line can be left in place.) The divider gauge is opened and the pinion input shaft is turned to force fluid through the divider lines to simulate a right turn. The left turn pressure line serves as a fluid return line. As a right turn is simulated, the steering pressure needle valve is closed partially to simulate steering pressure from a right turn. This tests for any oil leakage past the high pressure inner rack seal and the right turn side of the rack seal. Any pressure differential between the divider gauge and the main pressure gauge indicates oil leakage.

The divider is then substituted for the left turn pressure line and the normal right turn pressure line is replaced. The input shaft to the pinion housing is turned to simulate a left turn, and the needle valve is metered down to simulate steering resistance. This tests for any leakage past the bulkhead seal and the left turn side of the rack seal.

Thus, the test unit simulates steering resistance and therefore permits the rack and steering unit to be bench tested (removed from the vehicle). The test unit permits isolating any oil leakage to the pinion housing or to one or the other side of the rack portion of the steering unit.

These and other aspects of the invention will be more fully understood by referring to the following detailed description and the accompanying drawings.

DRAWINGS

FIG. 1 is a fragmentary side elevation view illustrating a conventional power-assisted rack and pinion steering unit which is tested for oil leakage by a test unit according to principles of this invention;

FIG. 2 is a front elevation view illustrating the test unit of this invention;

FIG. 3 is a fragmentary, enlarged front elevation view illustrating the test unit in use connected to the rack and pinion steering unit;

FIG. 4 is a fragmentary perspective view, partly in cross section, illustrating the rack and pinion steering unit connected to the test unit;

FIG. 5 is a fragmentary, semi-schematic elevation view, partly in cross section, illustrating a system for simulating steering resistance; and FIG. 6 is a schematic diagram illustrating hydraulic fluid pressure line connections between the test unit and the rack and pinion steering unit.

DETAILED DESCRIPTION

FIG. 1 shows a conventional power-assisted rack and pinion steering unit 10 which is tested by the oil seal test unit of this invention. The steering unit includes an elongated tubular rack housing 12 having separate tie rods 14 projecting from right and left ends of the housing. A pair of bellows 16 inboard the tie rod ends protect tie rod ball joint sockets (not shown) at opposite ends of the rack (also not shown) which is inside the rack housing. A pinion housing 18 near one end of the rack housing projects upwardly at an angle from the rack housing. A pinion input shaft 20 above the pinion housing can be turned right or left for making right or left steering movements. A pinion gear (not shown) in the pinion housing is rotated to move the rack back and forth during right or left steering movements.

Movement of the rack is assisted by a hydraulic pressure power assist which includes a main hydraulic pressure inlet fitting 22 to the pinion housing and a main hydraulic pressure outlet fitting 24 from the pinion housing. The rack is connected to a piston (not shown) in a power cylinder inside the rack housing. A right turn hydraulic pressure line 26, in the form of a narrow diameter tubing, extends from a right turn inlet/outlet port 27 in the pinion housing to a right turn pressure line inlet/outlet fitting 28 on one side of the piston in the rack housing. A coupling 27a couples the right turn pressure line to the pinion housing. A left turn hydraulic pressure line 30 extends from a left turn inlet/outlet port 31 in the pinion housing to a left turn pressure line inlet/outlet fitting 32 on the opposite side of the piston. A coupling 31a couples the left turn pressure line to the pinion housing. A spool valve (not shown) inside the pinion housing directs the flow of hydraulic fluid to apply fluid pressure to the appropriate side of the piston during right or left steering movements. The spool valve operates in response to deflection of a torsion bar (not shown) inside the pinion housing. The torsion bar senses resistance of the wheels and weight of the vehicle when the steering wheel is turned. Of course, this deflection of the torsion bar occurs when the rack and pinion steering unit 10 is installed in the vehicle. The oil seal test unit of this invention tests the oil seals in the testing unit when the steering unit is removed from the vehicle; and consequently, there is no steering resistance provided by the wheels of the vehicle or the weight of the vehicle.

FIG. 2 illustrates a bench test unit 34 for testing the oil seals of the power steering unit for oil leakage. The power steering unit contains a number of oil seals to be tested for leakage. There are four oil seals on the valve spool and one lower pinion oil seal in the pinion housing 18. The rack portion of the power steering unit has a bulkhead seal, a rack seal, and a high pressure inner rack seal. All of these areas of the power steering unit can be tested for oil leakage by the oil seal test unit 34.

The test unit includes a generally rectangular housing 36 which contains an elongated reciprocating steering pressure simulating bar 38 extending across and entirely through the housing. Opposite end portions 40 of the bar project outside the housing. A pair of tie rod clamps 42 are secured to the exterior end portions 40 of the steering pressure simulating bar 38. Referring to FIG. 5, a steering pressure cylinder 44 inside the housing 36 has a piston 45 with an actuating rod 46 secured to the steering pressure simulating bar 38 at a point inside the housing. The cylinder 44 is secured in a fixed position inside the housing by a bolt 48 which extends from a yoke 53 on the cylinder through the wall of the housing 36. A washer 50 and nut 52 threaded onto the bolt fasten the hydraulic cylinder in place in the housing. One end of a rigid lever arm 54 is secured to a yoke 56 at the working end of the actuating rod 46. The opposite end of the level arm is secured to the steering pressure simulating bar 38 by a clamp 58.

Referring again to FIG. 2, a pair of laterally spaced apart mounting brackets 60 are secured to the exterior front face of the test unit. Each clamp has upper and lower support bars 62 used for supporting the rack and pinion steering unit 10 horizontally when the unit is being tested. FIG. 3 illustrates the rack and pinion steering unit 10 mounted to the mounting brackets 60 on the front face of the test unit. After the rack and pinion steering unit 10 is mounted on the test unit, the tie rods 14 at opposite ends of the steering unit are fastened to the tie rod clamps 42 on the steering pressure simulating bar 38. This is best shown in FIG. 4, which illustrates a tie rod end 14 secured to a clamp portion 64 of the tie rod clamps 42. A fastener 65 secures the clamp to the end of the tie rod. Each tie rod clamp also includes a rigid arm 66 extending from the portion 64 of the tie rod clamp to a clamp 68 on each end 40 of the bar 38. A separate fastener 70 secures each clamp 68 to the end portion of the bar.

Thus, lateral reciprocating travel of the tie rod ends 14 can transfer lateral reciprocating travel to the piston 45 in the cylinder 44 through the tie rod clamps 42 and the steering pressure simulating bar 38.

As shown best in FIG. 5, the cylinder 44 has a right turn hydraulic fluid inlet line 71 at one side of the piston and a left turn hydraulic fluid inlet line 72 at the opposite side of the piston. The two inlet lines are connected to a T-connection 73, which in turn, is connected to a supply line 74 extending to a surge tank 75 mounted inside the test unit housing. A load resistance valve in the form of a needle valve 76 in the line 74 controls the pressure of hydraulic fluid against which the piston travels in the cylinder. When the piston is moved in either the right or left direction, the piston moves against the pressure of the hydraulic fluid present in the system. This can simulate steering pressure. As the piston moves to the left or right, hydraulic fluid in the surge tank fills the opposite side of the cylinder so that there is no air in the system. The needle valve 76 can be metered down to increase the resistance of the hydraulic fluid against the travel of the piston to increase the amount of simulated steering pressure. The setting of the needle valve is controlled by a handle 77 on the front face of the test unit housing.

A pair of rigid tie rod blocks 78 (see FIG. 2) are mounted to opposite ends of the test unit above the exposed end portions 40 of the steering pressure simulating bar 38. Each tie rod block is mounted by a corresponding swivel support 80 for allowing the blocks to move toward or away from the ends 40 of the bar 38. The blocks can be placed over the ends 40 of the bar, and their abutment with the adjacent tie rod clamps 42 can stop lateral reciprocating motion of the bar 38 during test procedures described below.

A main hydraulic supply line 82 in the form of a flexible tubing extends out from the front face of the test unit. A separate hydraulic pressure return line 84 extends out from the housing adjacent the supply line. The supply line 82 has a coupling 86 at its remote end for attaching the supply line to the hydraulic pressure inlet fitting 22 on the pinion housing 18 of the rack and pinion steering unit. The hydraulic return line has a fitting 88 for coupling to the hydraulic pressure return fitting 24 on the pinion housing 18 of the power steering unit.

As schematically illustrated in FIG. 6, a hydraulic pump 90 in the test unit housing supplies hydraulic fluid to the main supply line 82. A motor 92 in the housing drives the pump. An on/off switch 94 (see FIG. 2) on the front face of the test unit housing controls operation of the pump motor. The main hydraulic supply line has a gauge 96 for indicating hydraulic pressure in the main supply line. A valve 98 controls the flow of hydraulic fluid in the supply line. The gauge 96 is mounted in the front face of the housing, and a handle 100 on the front face of the housing adjacent the gauge 96 controls the valve 98.

A high pressure flow divider in the test unit is adapted for substitution for either the right turn pressure line 26 or the left turn pressure line 30. The flow divider includes a first hydraulic line 102 adapted for connection to the pinion housing 18 of the power steering unit. The divider also includes a second hydraulic line 104 adapted for connection to the rack portion of the steering unit. The flow divider has a pressure gauge 106 for measuring the pressure of hydraulic fluid flowing through the divider from the first line 102 to the second line 104. A control valve 108 controls the flow of fluid from the first line 102 to the second line 104. A handle 110 for controlling the valve 108 extends through the front face of the test unit housing 36. The first line 102 of the divider has a coupling 112 at its remote end for coupling to either the right turn inlet/outlet port 27 or the left turn inlet/outlet port 31 of the pinion housing. The second hydraulic line 104 has a coupling 114 at its end for being connected to either the right turn inlet/outlet fitting 28 or the left turn inlet/outlet fitting 32 of the rack portion of the power steering unit.

The oil seals in the rack and pinion steering unit are tested according to the following procedure. The rack and pinion steering unit is removed from the vehicle and mounted on the test unit on the brackets 60. The main pressure supply and return lines 82 and 84 are connected to the main inlet/outlet ports 22 and 24 of the pinion housing 18. The rack and pinion steering unit is first flushed to remove any air from the hydraulic system. With the tie rod ends 14 disconnected from the tie rod clamps 42, the input shaft 20 of the pinion housing is rotated from stop to stop three or four times, using a torque wrench, to remove any trapped air from the system. During this preliminary step, the pump 90 is operated to circulate hydraulic fluid under pressure through the supply line 82, through the right and left turn hydraulic pressure lines 28 and 30, and back to the pump reservoir through the return line 84.

As a preliminary test, the bellows 16 at opposite ends of the rack housing 12 are removed; and with the pump operating at 200 psi or so neutral pressure on the pinion housing, the unit is visibly inspected for possible oil leakage. Oil leakage that may be present where the bellows have been removed can be a pinion side leak, caused by the high pressure inner rack seal or the lower pinion seal; or a leak at the opposite end of the rack, which could be a bulkhead seal leak.

The tie rod ends of the steering unit are then connected to the tie rod clamps 42 so that any right or left steering movements produced by turning the pinion input shaft 20 will move the steering pressure simulating bar 30 to the right or left.

The hydraulic pressure divider is then connected to the rack and pinion steering unit. The right turn hydraulic pressure line 26 is first removed from the power steering unit and replaced by the divider, as best illustrated in FIG. 3. The coupling 112 on the first line 102 of the divider is coupled to the right turn inlet/outlet port 27 on the pinion housing. The coupling 114 of the second line 104 of the divider is coupled to the right turn inlet/outlet fitting 28 on the rack housing. The normal left turn pressure line 30 is left in place on the steering unit.

The right side tie rod block 78 is then placed on the right end 40 of the steering pressure simulating bar 38 for limiting turning travel in the right direction.

The pinion housing is then checked for internal oil leakage. The divider valve 108 is closed by turning the handle 110 to the closed position. This blocks the passage of hydraulic fluid to the rack portion of the steering unit. With the pump motor 92 operating, hydraulic fluid is forced under pressure by the pump 90 through the main supply line 82 to the pinion housing and is returned through the main return line 84 to the pump reservoir. The pinion input shaft 20 is then turned to simulate a right turn. This flexes the torsion bar in the pinion housing, because of the steering pressure produced by turning the unit against the block 78 which prevents the tie rod end from moving to the right. With the torsion bar flexed, the reading on the divider gauge 106 is compared with the reading on the main supply pressure gauge 96. This tests the seals in the pinion housing to which pressure is applied when making a right turn. If the reading on the divider gauge 106 is the same as the reading on the main pressure gauge 96, it indicates that the (right turn) seals in the pinion housing are good. On the other hand, if there is a leak in the (right turn) seals of the pinion housing, the reading on the divider gauge will be lower than the reading on the main pressure gauge.

The oil seals in the pinion housing, to which pressure is applied when making a left turn, next can be tested. In this instance, the left turn pressure line 30 can be replaced with the divider, and the right turn pressure line 26 is placed back on the rack and pinion steering unit in its normal position. The divider valve 108 is closed; the left tie rod block 78 is placed on the left end of the steering pressure simulating bar 38; and the pinion housing input shaft 20 is turned to simulate a left turn, while monitoring the main pressure gauge 96 and the divider gauge 106. Any pressure difference indicates leakage past the (left turn) oil seals in the pinion housing.

Thus, if oil leakage in the pinion housing is indicated, the problem can be confined to the lower pinion seal or to any of the four seals on the valve spool.

After the pinion housing oil seals are checked, the seals on opposite sides of the rack housing are then checked. The first test is conducted with the divider substituted for the right turn pressure line 26, as illustrated in FIGS. 3 and 6. Parenthetically, it is preferable to make this test before the last-mentioned test of the (left turn) oil seals in the pinion housing, since it is more convenient to leave the divider in place substituted for the right turn pressure line 26. The stop blocks are removed from the ends of the steering pressure simulating bar 38, and the oil seals on the pinion side of the rack housing are first tested by simulating a right turn. The valve 108 in the divider is opened for allowing hydraulic fluid to flow from the main pressure line 82, through the pinion housing, through the divider lines 102 and 104 to the right side of the rack housing, after which fluid is returned through the left turn pressure line 30 (shown in dashed lines in FIG. 6) to the pinion housing, and then through the return line 84 to the pump reservoir. The pinion input shaft 20 is turned to the right and the needle valve 76 is metered down by closing it partially to create a load of about 400 to 800 psi on the system, simulating right turn steering pressure. The load resistance valve 76 reduces the flow of fluid to the cylinder 44 for providing simulated steering resistance against which the tie rods of the steering unit and the bar 38 must move when a right turn is made. The torsion bar in the pinion housing is flexed by turning the pinion input shaft to the right against this simulated steering pressure. By simulating a full turn to the right stop and then observing the main pressure gauge 96 and the divider gauge 108, the oil seals on the right side of the rack can be tested. At the right stop of the simulated right turn, the readings on both gauges should be the same if there is no oil leakage problem with the right side oil seals. If the pressure reading on the divider gauge 108 is lower than the reading on the main supply pressure gauge 92, then oil leakage is present on the right turn side of the rack housing, indicating leakage in either the high pressure inner rack seal, or the right turn side of the rack seal.

The left side of the rack housing is then tested for oil leakage. In this instance, the left turn pressure line 30 is removed and replaced with the divider lines 102 and 104. The first line 102 is coupled to the inlet/outlet port 31 of the pinion housing, and the second line 104 is coupled to the left turn inlet/outlet fitting 32 of the rack housing. The normal right turn pressure line 26 is replaced on the power steering unit. The oil seals on the left side of the rack housing are then tested by a procedure similar to the testing of the seals on the right side of the housing. That is, the stop blocks are removed from opposite ends of the reciprocating bar 38, the valve 108 in the divider line is left open, and the steering pressure valve 76 is metered down to produce steering effort when the input shaft 20 of the pinion housing is turned to simulate a left turn. Hydraulic fluid flows from the pinion housing through the first and second lines 102, 104 of the divider, into the left side of the rack housing, and returns through the right turn pressure line 26 to the pinion housing, and then through the return line 84 to the pump reservoir. As the needle valve 76 is being metered down and the left turn is simulated by turning the pinion input shaft, the main supply gauge 96 and the divider gauge 108 are observed. If there is no pressure differential between the readings on the two gauges, then no leakage is present in the seals on the left side of the rack housing. On the other hand, if the gauge readings show a lower pressure in the divider gauge than on the main supply pressure gauge, then oil leakage is present on the left side of the rack housing. This indicates oil leakage past either the bulkhead seal (also known as a rack bushing seal), or the left turn side of the rack seal.

Thus, the oil seal test unit of this invention can isolate where oil leakage is present in different areas of the power steering unit. For instance, if no leakage is present in the rack seals, but leakage is present in the pinion housing, then the pinion can be removed for replacing the seals without working on the rack portion of the unit. The quality of work, when oil seals are changed, also can be quickly tested by the test unit. By the ability to isolate areas where oil leakage exists, substantial time and expense can be saved in replacing the oil seals.

I claim:

1. An oil seal test unit for testing oil leakage in the oil seals of a power-assisted rack and pinion steering unit, in which the rack and pinion unit includes (a) a pinion housing having a main supply pressure inlet and outlet, a left turn fluid pressure connection, and a right turn fluid pressure connection; (b) a rack housing with a left turn fluid pressure fitting and a right turn fluid pressure fitting; and (c) right and left tie rod ends at opposite ends of the rack and pinion steering unit, the test unit comprising:

a source of hydraulic fluid under pressure;

main hydraulic pressure supply and return lines leading from and to the source of fluid under pressure, the main pressure supply and return lines each being adapted for connection to the main supply pressure inlet and outlet of the pinion housing;

a main pressure gauge for indicating fluid pressure flowing in the main supply line;

means for simulating steering pressure on either the right or left tie rod end of the steering unit; and a steering pressure divider having a first line for connection to either the right turn or the left turn fluid pressure connection of the pinion housing, a second line for connection to either the right turn or left turn fluid pressure fitting of the rack housing, a divider valve for controlling the flow of fluid from the first line to the second line, and a divider gauge for indicating fluid pressure of fluid flowing from the first line to the second line.

2. Apparatus according to claim 1 in which the steering pressure simulating means includes a hydraulic cylinder having a piston with an actuating rod, a reciprocating bar driven by travel of the actuating rod, and means for connecting the bar to opposite tie rod ends of the steering unit.

3. Apparatus according to claim 2 including a valve for increasing the resistance of hydraulic fluid in the cylinder to travel of the piston in response to travel of the steering pressure simulating bar.

4. Apparatus according to claim 3 including stop means for engaging opposite end portions of the steering pressure simulating bar to prevent travel of the bar in opposite directions.

5. Apparatus according to claim 1 including means for mounting the power-assisted rack and pinion steering unit on the test unit.

6. Apparatus according to claim 1 including a valve for controlling the flow of fluid in the main pressure supply line.

7. Apparatus according to claim 1 in which the source of hydraulic fluid under pressure includes a pump, means for operating the pump for forcing hydraulic fluid under pressure through the main supply line, and means for returning hydraulic fluid to the pump.

8. An oil seal test unit for testing for oil leakage in the oil seals of a power-assisted rack and pinion steering unit, in which the rack and pinion steering unit includes (a) a pinion housing having a main supply pressure inlet and outlet, a left turn fluid pressure connection, and a right turn fluid pressure connection; (b) a rack housing with a left turn fluid pressure fitting and a right turn fluid pressure fitting; and (c) right and left tie rod ends at opposite ends of the rack and pinion steering unit, the test unit comprising:

means for mounting the power-assisted rack and pinion steering unit;

a hydraulic pump for supplying hydraulic fluid under pressure;

a main hydraulic pressure supply line leading from the pump and having a coupling for connection to the main supply pressure inlet on the pinion housing;

a main hydraulic pressure return line leading to the pump and having a coupling for connection to the main pressure outlet from the pinion housing;

a main pressure gauge for indicating fluid pressure flowing in the main supply line;

a steering pressure divider having a first line for connection to either the right turn or the left turn fluid pressure connection of the pinion housing, a second line for connection to either the right turn or the left turn fluid pressure fitting of the rack housing, a divider valve for controlling the flow of fluid from the first line to the second line, and a divider gauge for indicating the pressure of fluid flowing from the first line to the second line;

a hydraulic cylinder, the cylinder having a piston with an actuating rod, a reciprocating bar driven by travel of the actuating rod, and means for connecting the bar to opposite tie rod ends of the steering unit for simulating steering pressure in response to left or right turn travel of the tie rods; and a valve for increasing the resistance of hydraulic fluid in the cylinder to travel of the piston in response to movement of the steering pressure simulating bar.

9. An oil seal test unit for testing oil leakage in the oil seals of a power-assisted rack and pinion steering unit, in which the rack and pinion unit includes (a) a pinion housing having a main supply pressure inlet and outlet, a left turn fluid pressure connection, and a right turn fluid pressure connection; (b) a rack housing with a left turn fluid pressure fitting and a right turn fluid pressure fitting; and (c) right and left tie rod ends at opposite ends of the rack and pinion steering unit, the test unit comprising:

a source of hydraulic fluid under pressure;

main hydraulic pressure supply and return lines leading from and to the source of fluid under pressure, the main pressure supply and return lines each being adapted for connection to the main supply pressure inlet and outlet of the pinion housing;

means for indicating the pressure of hydraulic fluid flowing in the main supply line;

means for simulating steering pressure on either the right or left tie rod end of the sterring unit;

a hydraulic line for connection to either the right turn or the left turn fluid pressure connection of the pinion housing; and means for indicating fluid pressure of fluid flowing in the hydraulic line.

10. Apparatus according to claim 9 in which the means for simulating steering pressure includes a hydraulic cylinder and means for transferring movement of the rod end of the steering unit to movement against the pressure of hydraulic fluid in the cylinder.

* * * * *

UNITED STATES PATENT AND TRADEMARK OFFICE
CERTIFICATE OF CORRECTION

PATENT NO. : 4,457,164

DATED : July 3, 1984

INVENTOR(S) : John H. Castoe

It is certified that error appears in the above-identified patent and that said Letters Patent is hereby corrected as shown below:

Column 4 Line 20        Change "testing" to --steering--.

Column 4 Line 50        Change "level" to --lever--.

Signed and Sealed this

Seventeenth Day of September 1985

[SEAL]

Attest:

Attesting Officer

DONALD J. QUIGG

Commissioner of Patents and Trademarks—Designate